Figure 1:
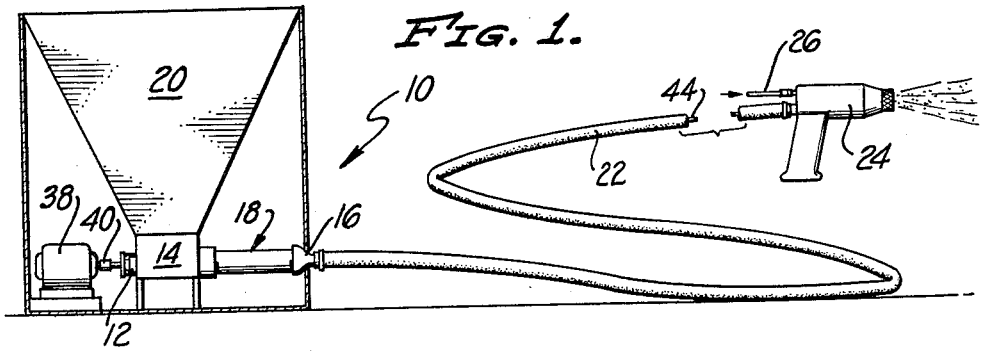

June 11, 1963     P. L. SCHOONOVER     3,093,364

APPARATUS AND METHOD FOR CONVEYING SLURRY

Filed May 20, 1960

INVENTOR.
PAUL L. SCHOONOVER
BY
ATTORNEY

United States Patent Office 3,093,364
Patented June 11, 1963

3,093,364
APPARATUS AND METHOD FOR CONVEYING
SLURRY
Paul L. Schoonover, Sherman Oaks, Calif., assignor to
Monolith Portland Cement Company, Los Angeles,
Calif., a corporation of Nevada
Filed May 20, 1960, Ser. No. 30,671
5 Claims. (Cl. 259—146)

This invention pertains to new and improved apparatus and method of conveying slurries.

Slurries normally are mixtures of solid particles and liquids. Frequently they are created and used for the purpose of conveying solids from one location to another, since they may be pumped so as to flow through known types of pipe and the like. As a class, slurries are distinguished from other solid-liquid mixtures in that they will tend to separate out into solid and liquid fractions under various circumstances, such as upon prolonged standing. Such separation on some occasions is desired; however, it is also very undesirable in other circumstances.

Frequently it leads to very serious consequences in such other circumstances. For example, in creating concrete structures by spraying a relatively viscous slurry or mixture of water, sand and ground cement onto a desired location, such separation tends to result in a final structure having a non-uniform character. This is undesirable. It is well known that concrete has ultimate, desired properties only when it is prepared from a uniform mixture, and that such properties are to a large extent a consequence of the composition of such a mixture. The separation of a slurry of water, sand and cement during the creation of concrete structures by spraying is also undesirable since it creates problems in conveying a mixture of this type.

In order to attempt to control the separation of slurries into fractions a number of different expedients have been utilized. In general such expedients have largely been of a "chemical" category since they have involved the use of special additives or the like in order to prevent or retard separation. Common wetting agents and other relatively expensive materials of this type have frequently been used for this purpose. The cement used in spraying concrete structures has frequently been blended with asbestos in order to achieve a composition which is somewhat immune to separation into fractions as it is being employed. With this type of expedient the asbestos is used because of its apparent affinity for water, and the fact that it tends to "hold" water so as to prevent such liquid from separating away from solid materials within a slurry.

A broad object of the present invention is to provide a new procedure for handling slurries so as to prevent the separation of such slurries into fractions as they are being moved through conduits, piping or the like. Another object of the present invention is to provide a simple, inexpensive method of this type which utilizes solely mechanical means as opposed to chemical means in order to accomplish this result. A still further object of this invention is to provide new and improved apparatus for controlling the separation of slurries being moved through piping, conduits or the like. Additional objects of the present invention are to provide an apparatus as indicated which is relatively inexpensive to manufacture, which is extremely efficient to use and which may be operated at a very nominal cost.

Figure 2:
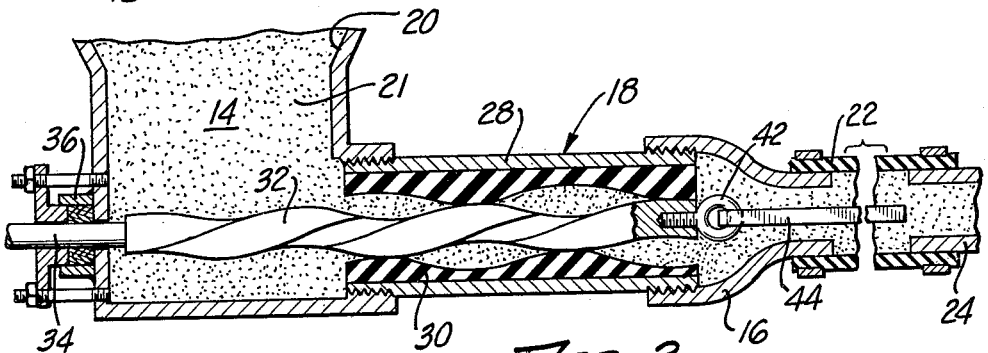
Figure 3:
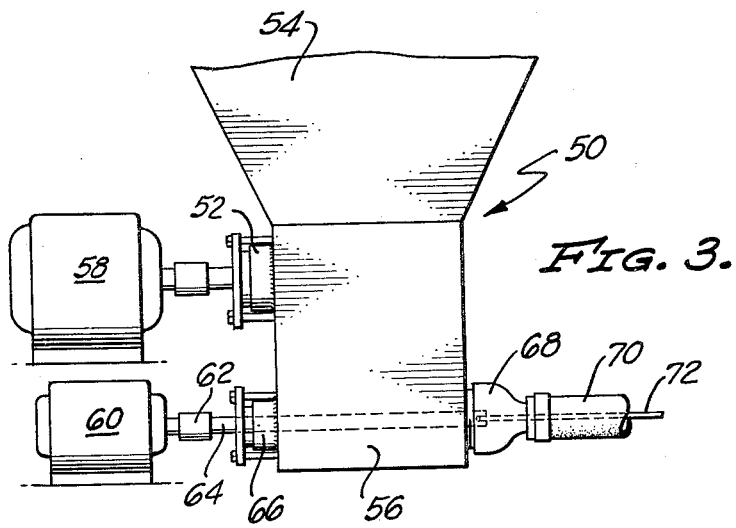

These and various other objects and advantages of this invention will be more fully apparent from a detailed consideration of the remainder of this specification including the appended claims and the accompanying drawing in which:

FIG. 1 is a side elevational view of an apparatus of this invention;
FIG. 2 is a vertical cross-sectional view of the apparatus shown in FIG. 1; and
FIG. 3 is a partial side elevational view of a modified apparatus of this invention.

The accompanying drawing is primarily intended to illustrate clearly several presently preferred embodiments or forms of this invention. Those skilled in the art to which this disclosure is directed will realize that the basic features or principles of this invention as set forth herein can be applied in the creation of a number of types of apparatus of different appearance through the use of routine engineering skill or ability.

As an aid to understanding this invention, it may be stated in essentially summary form that it is based upon the use of an elongated flexible member which extends through a conduit used in conveying a slurry. As a slurry is passed through such a conduit in accordance with this invention the elongated, flexible member is constantly turned so as to achieve an agitating effect, preventing this slurry from separating into solid and liquid fractions or components.

The actual nature of this invention is more fully described by referring directly to the accompanying drawing. In FIG. 1 of the drawing there is shown a complete slurry conveying apparatus 10 of this invention. This apparatus 10 utilizes a pump 12 having an inlet chamber 14 connected to an outlet chamber 16 by means of a pumping section 18. The inlet chamber 14 is attached to a hopper 20 which is adapted to receive a slurry 21 and convey this slurry by gravity into the inlet chamber 14. An elongated, flexible hose or conduit 22 is attached to the outlet chamber 16 and leads to a spray gun 24 of a known type which is adapted to utilize compressed air coming into it through a conduit 26 in spraying the slurry conveyed to it from within the hopper 20.

The pumping section 18 of the pump 12 is built to include a rigid cylinder 28 within the interior of which there is located an elastomeric pump stator 30 in an unstressed condition. This stator 30 has a spiral interior shape corresponding to the external shape of the elongated pump rotor or impeller 32 which passes through the cylinder 28 so as to be aligned with the end of the hose 22 attached to the chamber 16. This rotor 32 is preferably formed of steel or the equivalent so as to be part of a shaft 34. The shaft 34 passes from the inlet chamber 14 out through a stuffing gland 36. On the exterior of the pump 12 proper this shaft 34 is attached to a motor 38 by means of a coupling 40. As the motor 38 is turned the stator 30 is deformed by the rotor 32 in order to achieve a pumping action as shown in FIG. 2.

The end of the rotor 32 located adjacent to the outlet chamber carries an eye bolt 42. The eye of this bolt 42 is secured to an elongated, flexible, relatively thin member 44 in such a manner that as the motor 38 is operated so as to operate the pump 12 this member 44 is constantly rotated. The member 44 preferably extends substantially the entire length of the flexible hose 22 and terminates adjacent to the gun 24 as indicated in FIG. 2 of the drawing. As the complete apparatus 10 is being operated the member 44 will constantly rotate and move back and forth within the hose 22 in much the manner in which a snake weaves so as to constantly agitate any slurry present within this hose, preventing such slurry from tending to separate into solid and liquid fractions.

The member 44 may, of course, be created out of a number of different materials having the properties indicated in the preceding discussion. Thus, the member 44 may, if desired, be formed out of an elongated coil spring or the like. It is presently preferred, however, to form this member 44 out of spring steel strip inasmuch as such material is relatively strong and, hence, is capable of withstanding the stresses and strains placed upon it during the use of the apparatus 10. Further, a spring steel strip is flexible enough so that it will operate in the desired manner as the hose 22 is twisted and turned from one direction to another as is necessary during the use of the apparatus 10. Obviously, of course, the member 44 should be smaller in its largest dimension than the interior diameter of the hose 22. The flat member 44 may also be spiraled slightly so as to serve a pumping function within the hose 22 along with the agitation function herein described. The member 44 may be attached to the rotor 32 in other manners than the specific manner shown.

It is possible to form an apparatus of this invention which utilizes separate sources of power in order to achieve a pumping action and an agitating action as herein described, although this is not normally preferred because of cost considerations. Such an apparatus 50 is illustrated in FIG. 3 of the drawing. It employs a conventional slurry pump 52 which receives material from a hopper 54 and forces such material into an outlet chamber 56 as a motor 58 is operated in order to drive this pump. In accordance with this invention another motor 60 is attached by means of a coupling 62 to a shaft 64 which projects through a stuffing box 66 into the outlet chamber 56. The shaft 64 is preferably aligned with an outlet nozzle 68 leading from the chamber 56.

Either a flexible or rigid hose 70 may be attached to the nozzle 68 in a known manner so as to lead from it. In accordance with this invention an elongated, flexible member 72 having the form of an elongated, closely coiled spring is attached as by welding or other equivalent methods to the terminus of the shaft 64 so as to extend away from the outlet chamber 56 through substantially the entire length of the hose 70. Preferably the member 72 extends through substantially the entire length of the hose; the member 72 corresponds to the member 44 previously described. If desired, it may be a flat strip of spring steel or the like.

When the apparatus 50 is operated for the intended purpose a slurry is placed within the hopper 54 and the motors 58 and 60 are actuated so as to operate the pump 52 and so as to turn the elongated, flexible member 72. As a result of the turning of this member 72 constant agitation of the material passing through the hose 70 will be achieved and hence, there will be no tendency or danger of this slurry separating out into fractions within this hose.

One advantage of the apparatus 50 as opposed to the apparatus 10 lies in the fact that the member 72 in the apparatus may be turned at any speed desired in order to obtain optimum performance. This speed may, in the apparatus 50, be completely different from the speed at which the motor 58 is operated. Further, the pump 52 in the apparatus 50 may be of any type. However, these advantages are presently considered to be offset by the greater simplicity and lower cost involved in the construction shown in conjunction with the apparatus 10.

It will be seen from the aforegoing that the principles of this invention can be utilized in a number of differently appearing structures, and that a number of differently appearing structures and a number of different types of elongated, flexible members may be employed in order to achieve the effects or results described in this specification. Both of the apparatuses herein described are considered to be particularly adapted for use in conveying mixtures of cement, sand and water in processes for spraying such mixtures upon an appropriate surface in order to create a concrete structure. In utilizing the method inherent in the operation of both of the apparatuses shown it is possible to use conventional concrete in such mixtures instead of concrete which has additives, such as asbestos. As a consequence of this, cost savings are possible through the utilization of the present invention.

Because of the nature of this invention it is to be considered as being limited only by the appended claims forming a part of this disclosure.

I claim:

1. An apparatus for conveying a slurry mixture which includes: pump means having an inlet and an outlet and a rotor extending toward said outlet; an elongated, flexible hose attached to said outlet so as to extend therefrom, the end of said hose which is attached to said outlet being aligned with said rotor; and an elongated, single, unitary flexible member attached to said rotor so as to extend therefrom, said member extending through substantially the entire length of said hose, said member having a free and unsupported end located within said hose and being capable of being bent in the same manner as said hose.

2. An apparatus for conveying a slurry mixture as defined in claim 1 wherein said elongated, flexible member is a spring steel strip.

3. An apparatus for conveying a slurry mixture which includes: a pump means having an outlet chamber; a shaft extending into said outlet chamber; said shaft being rotatably mounted; means for rotating said shaft attached to said shaft; an elongated, flexible hose attached to said outlet chamber so as to extend therefrom in alignment with said shaft and an elongated, single unitary flexible member attached to said shaft so as to extend therefrom in alignment with said shaft, said flexible member extending through substantially the entire length of said hose, said member having a free and unsupported end located within said hose and being capable of being bent in the same manner as said hose.

4. An apparatus for conveying a slurry mixture as defined in claim 3 wherein said elongated, flexible member is a coil spring.

5. A method of conveying a slurry of solids within a liquid through an elongated flexible conduit so as to prevent said slurry from separating into fractions, which method comprises: forcing a slurry of solids within a liquid into one end of an elongated, flexible conduit which is capable of being bent while simultaneously agitating said slurry by turning an elongated, flexible member capable of being bent to a shape conforming to any position of said conduit within the interior of said conduit, by rotating an end of said member located within said end of said conduit, said member extending substantially the length of said conduit and fitting within the interior of said conduit.

References Cited in the file of this patent
UNITED STATES PATENTS

| | | |
|---|---|---|
| 188,399 | Mosher | Mar. 13, 1877 |
| 975,803 | Smith | Nov. 15, 1910 |
| 988,438 | Branson et al. | Apr. 1, 1911 |
| 1,037,106 | Baumberger | Aug. 27, 1912 |
| 1,208,862 | Velissarides | Dec. 19, 1916 |
| 1,247,948 | Forbes | Nov. 27, 1917 |
| 1,303,300 | Hall | May 13, 1919 |
| 1,782,871 | Fischer | Nov. 25, 1930 |
| 2,092,353 | Kyseth et al. | Sept. 7, 1937 |
| 2,161,553 | Westberg et al. | June 6, 1939 |
| 2,182,680 | Rugg et al. | Dec. 5, 1939 |
| 2,228,421 | Taylor | Jan. 14, 1941 |
| 2,299,565 | Colburn | Oct. 20, 1942 |
| 2,552,763 | Baumann | May 15, 1951 |
| 2,600,707 | Turnbaugh | June 17, 1952 |
| 2,661,194 | Katovsich | Dec. 1, 1953 |
| 2,924,180 | Bourke et al. | Feb. 9, 1960 |
| 2,954,261 | Taupin | Sept. 27, 1960 |

FOREIGN PATENTS

| | | |
|---|---|---|
| 316,801 | Great Britain | Aug. 8, 1929 |
| 699,259 | Great Britain | Nov. 4, 1953 |